United States Patent Office 2,769,807
Patented Nov. 6, 1956

2,769,807

PRODUCTION OF CAPROLACTAM

Lorraine Guy Donaruma, Woodbury, N. J., and David C. England, Wilmington, Del., assignors to E. I. du Pont de Nemours and Company, Wilmington, Del., a corporation of Delaware No Drawing. Application May 21, 1954,
Serial No. 431,597

8 Claims. (Cl. 260—239.3)

The present invention relates to a process for the production of lactams. More particularly, the present invention relates to a process whereby lactams can be produced from water-soluble salts of nitrocycloalkanes in a single reaction.

Lactams are used for the production of polyamides suitable for the manufacture of fabrics, films, fibers, coating compositions, and the like. Heretofore, the usual preparation of lactams has been by Beckmann rearrangement of oximes. Caprolactam, the most important member of this class, has long been prepared by rearrangement of cyclohexanone oxime. However, it has been necessary to prepare the cyclohexanone oxime intermediate by means of one or more reactions. For example, the preparation of the oxime by treating nitrocyclohexane or its salts with hydroxylamine, hydrogen, ammonia, amines, sulfides, olefins, alkylene oxides, and the like, is well-known in the art. It is also known to prepare cyclohexanone oxime by treatment of cyclohexanone with hydroxylamine, by treatment of cyclohexanone-bisulfite complexes with nitrous acid, and by like processes. Although such multi-step processes for the preparation of lactams have generally produced satisfactory products, the need has long been recognized for a process whereby lactams could be prepared in a single reaction.

An object of the present invention is to provide a process for the direct preparation of lactams. Another object of the present invention is to provide a process whereby lactams can be prepared in a single reaction. A still further object of the present invention is to provide an efficient process for converting water-soluble salts of nitrocycloalkanes to the corresponding lactams. Other objects will become apparent as the invention is further described.

It has been found that the foregoing objects can be accomplished by reacting an aqueous solution of a water-soluble salt of a nitrocycloalkane with a sulfuric acid solution of a primary nitro alkane, said sulfuric acid being present throughout the reaction in an amount by weight at least equal to the amount of water.

In accordance with the process of the present invention, an aqueous solution of a water-soluble salt, e. g., an alkali metal or ammonium salt, of a nitro cycloalkane, e. g., nitrocyclohexane or nitrocyclopentane, is caused to react with a sulfuric acid solution of a primary nitro alkane, e. g., nitromethane or nitroethane, said sulfuric acid being present throughout the reaction in an amount by weight at least equal to the amount of water, and the temperature during said reaction being maintained between 100 and 170° C.

The following examples serve to illustrate specific embodiments of the method of carrying out the present invention, and they will be understood to be illustrative only and not limiting the invention in any way.

*Example 1*

Thirteen parts of nitrocyclohexane was disssolved in 75 parts of water containing 4 parts of sodium hydroxide, and nitromethane in an amount of 20 parts was added to 190 parts of 95% sulfuric acid at 120–125° C. The temperature of the mixture was then adjusted to about 120° C., and the sodium nitrocyclohexane solution was added to the nitromethane-sulfuric acid mixture at a rate such that the temperature of the mixture was held between 120 and 125° C. The mixture then was neutralized and extracted with chloroform. The chloroform was removed by distillation, and the residue was distilled under reduced pressure to produce 8.2 parts of caprolactam. This corresponds to a yield of 73%.

The procedure of the foregoing example was employed in the following runs, the nitromethane being mixed with the sulfuric acid at 120–125° C. before addition of the solution of the sodium salt of nitrocyclohexane (NCH).

| Run | Reactants Used (parts) | | | | | Temperature (° C.) of addition of Sodium NCH solution to CH$_3$NO$_2$—H$_2$SO$_4$ Mixture | Caprolactam Produced (parts) | Yield (Percent) |
|---|---|---|---|---|---|---|---|---|
| | NCH | NaOH | H$_2$O | CH$_3$NO$_2$ | 95% H$_2$SO$_4$ | | | |
| A | 13 | 4 | 50 | 10 | 190 | 130–140 | 5.9 | 52 |
| B | 129 | 40 | 375 | 100 | 950 | 120–125 | 75 | 67 |
| C | 13 | 4 | 28 | 10 | 53 | 120–125 | 2 | 18 |
| D | 13 | 4 | 75 | 10 | 180 | 100–105 | 2 | 18 |
| E | 13 | 4 | 50 | 10 | 100 | 120–125 | 5 | 44 |

*Example 2*

A mixture prepared by the addition of 10 parts of nitromethane to 180 parts of 95% sulfuric acid at 120–125° C. was cooled to about 120° C. To this mixture then was added an aqueous solution of ammonium nitrocyclohexane at a rate such that the temperature of the mixture was maintained between 120 and 130° C. The mixture was treated as in the foregoing examples to produce 6 parts of caprolactam, corresponding to a 53% yield.

*Example 3*

Twelve parts of nitrocyclopentane was dissolved in 75 parts of water containing 4 parts of sodium hydroxide, and nitromethane was added to concentrated sulfuric acid as in Example 2. The sodium nitrocyclopentane solution then was added to the nitromethane-sulfuric acid mixture at a rate which maintained the mixture temperature between 120 and 130° C. The mixture was worked up according to the method of the foregoing examples to produce δ-valerolactam in an amount of 4.7 parts, which corresponded to a yield of 46.5%.

*Example 4*

Ten parts of nitromethane and a sodium nitrocyclohexane solution, prepared by dissolving 13 parts of nitrocyclohexane in 75 parts of water containing 4 parts of sodium hydroxide, were added simultaneously to 180 parts of 95% sulfuric acid, the rate of addition being so controlled as to hold the temperature of the mixture between 120 and 140° C. The mixture was treated as in the foregoing examples. Caprolactam was obtained in an amount of 6.2 parts, which corresponded to a yield of 55%.

Example 5

A sodium nitrocyclohexane solution, prepared by the method of Example 4, was added to a solution of 6 parts of nitromethane in 180 parts of 95% sulfuric acid (mixed at 120–125° C.). When the mixture was worked up by the method of the preceding examples, 5.8 parts of caprolactam was obtained, corresponding to a 51% yield.

Example 6

Nitrocyclohexane in an amount of 13 parts was dissolved in 75 parts of water containing 4 parts of sodium hydroxide, and this solution was added at 120–130° C. to a solution prepared by adding 8 parts of nitroethane to 190 parts of 95% sulfuric acid at 120–125° C. The procedure of the foregoing examples was employed in working up the mixture. Caprolactam was obtained in an amount of 7.3 parts, corresponding to a yield of 65%.

As the foregoing examples show, the highest yields are obtained in the process of the invention when the temperature maintained during the reaction is between 120 and 140° C. and when the primary nitro alkane is added to the sulfuric acid prior to the addition of the salt of the nitro compound. However, Run D of Example 1 indicates that the process of the invention can be operated as low as 100° C. Temperatures above 170° C. should be avoided because of excessive decomposition of the reactants. Example 4 shows that it is entirely in accord with the present invention to add the nitro alkane and the salt of the nitro compound simultaneously to the sulfuric acid. The sulfuric acid should be present throughout the reaction in an amount by weight at least equal to the amount of water, although, as the examples show, higher concentrations of the acid are desirable.

Although the process of the present invention has been primarily applied in the examples to the preparation of lactams such as ε-caprolactam and δ-valerolactam, the process is equally applicable to the production of other lactams and substituted lactams, as for example, butyrolactam, enantholactam, caprylolactam, and substituted caprolactams and valerolactams, and the like. Other nitro cycloalkanes such as nitrocyclobutane, nitrocycloheptane, nitrocyclooctane, and substituted nitro cycloalkanes can also be used as starting materials in the present process. The nitro compounds are employed in the form of their sodium and ammonium salts in the foregoing examples, but the process of the invention is not limited to the use of these salts; the other water-soluble alkali metal salts can be employed. The nitromethane and nitroethane can similarly be replaced in the present process by other primary nitro alkanes, e. g., 1-nitropropane.

In the foregoing, the process of the invention has been carried out batchwise, but a continuous process is equally possible, for example, by continuously and simultaneously introducing the solution of the salt of the nitro cycloalkane and the nitro alkane into sulfuric acid and continuously removing the product therefrom, the amount by weight of sulfuric acid in the reaction zone being maintained at least equal to the amount of water present.

The invention has been described in detail in the foregoing. It will be understood that many variations can be introduced without departing from the scope of the invention. It is intended, therefore, that the invention be limited only by the following claims:

We claim:

1. A process for the preparation of lactams which comprises reacting an aqueous solution of a water-soluble salt of a nitro cycloalkane with a sulfuric acid solution of a primary nitro alkane, said sulfuric acid being present throughout the reaction in an amount by weight at least equal to the amount of water and the temperature during said reaction being maintained between 100 and 170° C.

2. The process as claimed in claim 1 wherein the nitro cycloalkane is nitrocyclohexane.

3. The process as claimed in claim 1 wherein the nitro cycloalkane is nitrocyclopentane.

4. The process as claimed in claim 1 wherein the water-soluble salt of the nitro cycloalkane is an alkali metal salt.

5. The process as claimed in claim 1 wherein the water-soluble salt of the nitro cycloalkane is the ammonium salt.

6. The process as claimed in claim 1 wherein the primary nitro alkane is nitromethane.

7. The process as claimed in claim 1 wherein the primary nitro alkane is nitroethane.

8. The process as claimed in claim 1 wherein the molar ratio of the nitro alkane to the salt of the nitro cycloalkane is at least 1/1.

References Cited in the file of this patent

UNITED STATES PATENTS

| 2,313,026 | Schlack | Mar. 2, 1943 |
| 2,569,114 | Novotny | Sept. 25, 1951 |
| 2,634,269 | England | Apr. 7, 1953 |

FOREIGN PATENTS

| 59,519 | Netherlands | June 16, 1947 |

OTHER REFERENCES

Nametkin et al.: Chem. Abst., vol. 44, col. 9362 (1950).